(12) United States Patent
Nishigaki et al.

(10) Patent No.: US 11,453,091 B2
(45) Date of Patent: Sep. 27, 2022

(54) SCREW LENGTH DETERMINATION SYSTEM, SCREW-TIGHTENING SYSTEM AND STORAGE MEDIUM

(71) Applicant: OMRON Corporation, Kyoto (JP)

(72) Inventors: Koji Nishigaki, Kusatsu (JP); Tatsuya Sasaki, Otsu (JP); Takanori Shibutani, Otsu (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 17/278,666

(22) PCT Filed: Sep. 25, 2019

(86) PCT No.: PCT/JP2019/037679
§ 371 (c)(1),
(2) Date: Mar. 23, 2021

(87) PCT Pub. No.: WO2020/090301
PCT Pub. Date: May 7, 2020

(65) Prior Publication Data
US 2022/0040805 A1 Feb. 10, 2022

(30) Foreign Application Priority Data
Oct. 29, 2018 (JP) .............................. JP2018-203046

(51) Int. Cl.
*B23P 19/06* (2006.01)
*G01B 21/02* (2006.01)

(52) U.S. Cl.
CPC ............ *B23P 19/066* (2013.01); *G01B 21/02* (2013.01)

(58) Field of Classification Search
None
See application file for complete search history.

(56) References Cited

U.S. PATENT DOCUMENTS

| 4,530,143 A | 7/1985 | Casarcia |
| 2002/0023503 A1 | 2/2002 | Schneider et al. |

FOREIGN PATENT DOCUMENTS

| CN | 106493552 | 3/2017 |
| JP | H0263932 | 5/1990 |
| JP | H06170663 | 6/1994 |
| JP | H06262453 | 9/1994 |

(Continued)

OTHER PUBLICATIONS

"International Search Report (Form PCT/ISA/210) of PCT/JP2019/037679," dated Dec. 3, 2019, with English translation thereof, pp. 1-4.

(Continued)

*Primary Examiner* — Raul J Rios Russo
*Assistant Examiner* — Carl F. R. Tchatchouang
(74) *Attorney, Agent, or Firm* — JCIPRNET

(57) ABSTRACT

Provided is a screw length determination system capable of determining the length of a screw with a high degree of accuracy. A PLC (10) determines the length of a screw on the basis of the amount of rotation or the position in the axial direction of a driver during a period lasting from the time when the screw completes its descent until any time from among the time when provisional seating occurs, the time when the primary tightening period ends and the time when the period of holding for primary tightening ends.

11 Claims, 6 Drawing Sheets

(56) References Cited

FOREIGN PATENT DOCUMENTS

| | | | |
|---|---|---|---|
| JP | H07164261 | | 6/1995 |
| JP | H07280677 | | 10/1995 |
| JP | H07280677 A | * | 10/1995 |
| JP | H09285921 | | 11/1997 |
| JP | 2012223841 | | 11/2012 |
| JP | 2013031888 | | 2/2013 |
| JP | 2013132693 | | 7/2013 |
| KR | 20160054200 | | 5/2016 |

OTHER PUBLICATIONS

"Written Opinion of the International Searching Authority (Form PCT/ISA/237) of PCT/JP2019/037679," dated Dec. 3, 2019, with English translation thereof, pp. 1-6.

"Search Report of Europe Counterpart Application", dated Jun. 24, 2022, p. 1-p. 7.

"Office Action of China Counterpart Application" with English translation thereof, dated Jul. 11, 2022, p. 1-p. 11.

* cited by examiner (a)

(b)

(a)

(b)

| Average value of position | Not include value equal to and more than TH | Include value equal to and more than TH |
|---|---|---|
| Length of screw | L8 | L10 |

SCREW LENGTH DETERMINATION SYSTEM, SCREW-TIGHTENING SYSTEM AND STORAGE MEDIUM

CROSS-REFERENCE TO RELATED APPLICATION

This application is a 371 application of the International PCT application serial no. PCT/JP2019/037679, filed on Sep. 25, 2019, which claims the priority benefits of Japan Patent Application No. 2018-203046, filed on Oct. 29, 2018. The entirety of each of the above-mentioned patent applications is hereby incorporated by reference herein and made a part of this specification.

BACKGROUND

Technical Field

The present invention relates to a screw length determination system that determines a length of a screw in a screw tightening process, a screw-tightening system including the screw length determination system, and a program.

Related Art

Patent Literature 1 discloses a bolt tightening abnormality detection method and the like. In this method, a seat part of a bolt is tightened twice in succession until it is seated on a fastening target, and a timer measures a time required from a rotation start time of a motor or socket to the seating of the bolt in a second tightening operation. A length of the bolt is determined by comparing this time with a standard time when a controller uses a proper bolt.

CITATION LIST

Patent Literature

Patent Literature 1
Japanese Patent Application Laid-Open No. H07-164261 (laid-open on Jun. 27, 1995)

SUMMARY

Technical Problem

However, for example, in a case in which there is a variation in a distance from a position of the bolt to the fastening target at the rotation start time of the motor or socket, or the like, the time required for seating of the bolt changes. For this reason, in the method described in Patent Literature 1, there is a concern that the length of the bolt may not be accurately determined.

An objective of one aspect of the present invention is to realize a screw length determination system or the like capable of determining a length of a screw with high accuracy.

Solution to Problem

In order to solve the above problems, a screw length determination system according to one aspect of the present invention determines a length of a screw on the basis of an axial position or an amount of rotation of a driver during a period from a time of descent completion to any of a time of provisional seating, an end time of a primary tightening period, and an end time of a primary tightening holding period, in a case in which a time when a tip of the screw comes into contact with a fastening target that is a target for screw tightening is defined as the time of descent completion, a time when a seating surface of the screw comes into contact with the fastening target is defined as the time of provisional seating, a period during which a rotation torque of a first motor that causes a rotational movement of the driver around an axis for tightening the screw is equal to or greater than a first predetermined value and less than a second predetermined value, and a moving torque of a second motor that causes the driver to reciprocate in an axial direction is a third predetermined value is defined as the primary tightening period, and a period during which the rotation torque of the first motor that causes the rotational movement of the driver around the axis is the second predetermined value, and the moving torque of the second motor that causes the driver to reciprocate in the axial direction is the third predetermined value is defined as the primary tightening holding period.

Effects

According to the screw length determination system according to one aspect of the present invention, a length of a screw can be determined with high accuracy.

DESCRIPTION OF THE EMBODIMENTS

Hereinafter, an embodiment according to one aspect of the present invention (hereinafter, also referred to as "the present embodiment") will be described with reference to the drawings.

§ 1 Application Example

Figure 1:
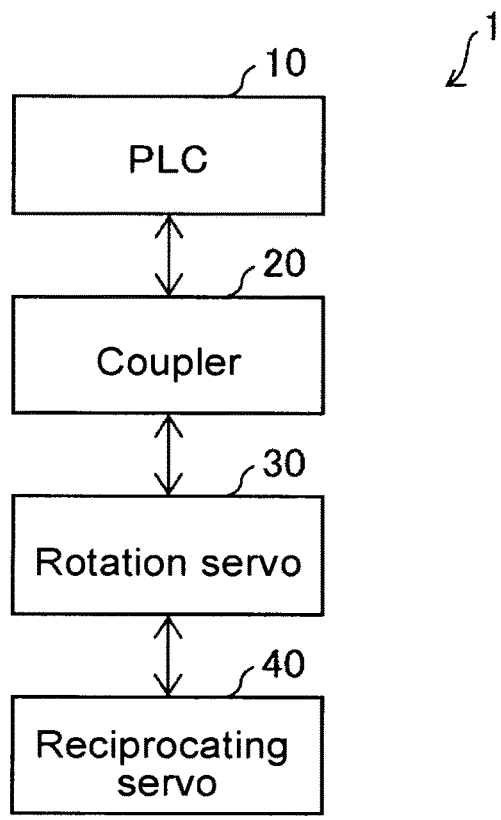
FIG. 1 is a block diagram showing an outline of a screw-tightening system according to the present embodiment.

FIG. 1 is a block diagram showing an outline of a screw-tightening system 1 according to the present embodiment. As shown in FIG. 1, the screw-tightening system 1 includes a programmable logic controller (PLC) 10 (a screw length determination system), a coupler 20, a rotation servo 30 (a first motor), and a reciprocating servo 40 (a second motor, and an axial position detection part). The screw-tightening system 1 performs a screw tightening operation using a rotational movement of a driver 51 (see FIG. 2), which will be described later, around an axis thereof and a reciprocating motion of the driver 51 in an axial direction thereof. In this case, the PLC 10 performs control of the screw tightening operation and determines whether or not a length of a screw is correct.

In a case in which the length of the screw is not appropriate, a screw tightening failure such as bottoming (when the screw tightening operation stops halfway because the screw is longer than a screw hole or foreign matter has accumulated in the screw hole) or a short length of the screw screwed into the screw hole will have occurred. The screw tightening failure is a state in which a screw does not exert a sufficient fastening force even though a standard torque is applied to the screw. The PLC 10 inhibits occurrence of the above-mentioned screw tightening failure by determining the length of the screw.

The rotation servo 30 is a motor that causes the rotational movement of the driver 51 around the axis. Further, the rotation servo 30 outputs its own rotation speed (deg./s), an amount of rotation (deg.), and a rotation torque (a ratio thereof to a rated torque (%)) to the coupler 20.

The reciprocating servo 40 is a motor that causes the driver 51 to reciprocate in the axial direction. Further, the reciprocating servo 40 outputs a moving speed (mm/s), a moving position (mm), and a moving torque (a ratio (%) thereof to a rated torque) of the driver 51 due to its own rotation to the coupler 20. For this reason, the reciprocating servo 40 also functions as an axial position detection part that detects a position of the driver 51 in the axial direction.

The coupler 20 connects the PLC 10 to the rotation servo 30 and the reciprocating servo 40. Specifically, the coupler 20 transmits a control signal received from the PLC 10 to the rotation servo 30 and the reciprocating servo 40. Further, the coupler 20 transmits the rotation speed, the amount of rotation, and the rotation torque of the rotation servo 30 received from the rotation servo 30 to the PLC 10. Also, the coupler 20 transmits the moving speed, the moving position, and the moving torque of the driver 51 due to the rotation of the reciprocating servo 40 received from the reciprocating servo 40 to the PLC 10.

In the following description, the rotation speed, the amount of rotation, and the rotation torque of the rotation servo 30, and the moving speed, the moving position, and the movement torque of the driver 51 due to the rotation of the reciprocating servo 40 may be collectively referred to as parameters.

Figure 2:
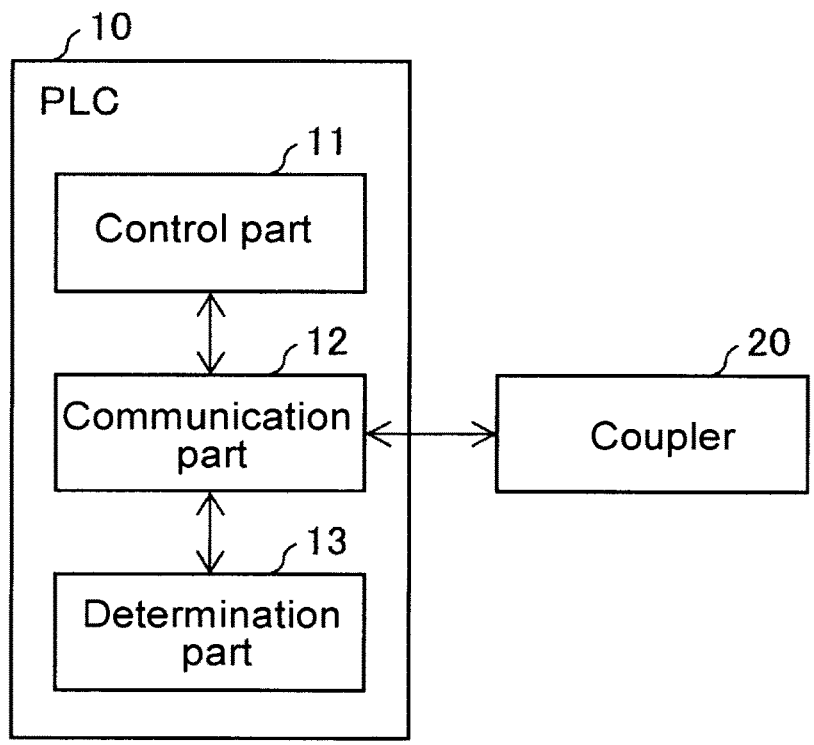
FIG. 2 is a block diagram showing a configuration of a PLC.

FIG. 2 is a block diagram showing a configuration of the PLC 10. The PLC 10 controls an operation of the screw-tightening system 1. As shown in FIG. 2, the PLC 10 includes a control part 11, a communication part 12, and a determination part 13 (a speed measurement part and a length determination part).

The control part 11 outputs a control signal for controlling the rotation servo 30 and the reciprocating servo 40 to the communication part 12. The communication part 12 transmits the control signal input from the control part 11 to the coupler 20. The control signal is transmitted to the rotation servo 30 and the reciprocating servo 40 via the coupler 20 to control the rotation servo 30 and the reciprocating servo 40. The control part 11 controls the rotation servo 30 and the reciprocating servo 40 in synchronization with each other. Further, the control part 11 feeds back the parameters of the rotation servo 30 and the reciprocating servo 40 to the control of the rotation servo 30 and the reciprocating servo 40.

The communication part 12 receives the parameters from the rotation servo 30 and the reciprocating servo 40 via the coupler 20. The communication part 12 stores the received parameters in a storage device (not shown). Further, the screw-tightening system 1 may include a storage device for storing the received parameters. The control part 11 and the determination part 13 acquire the parameters from the storage device as needed. Also, for the sake of simplicity, in FIG. 2, the communication part 12 outputs the parameters to the control part 11 and the determination part 13.

The determination part 13 determines the length of the screw on the basis of the parameters in the screw tightening process. A specific example of the determination performed by the determination part 13 will be described later.

§ 2 Configuration Example

Configuration of Screw-Tightening System 1

Figure 3:
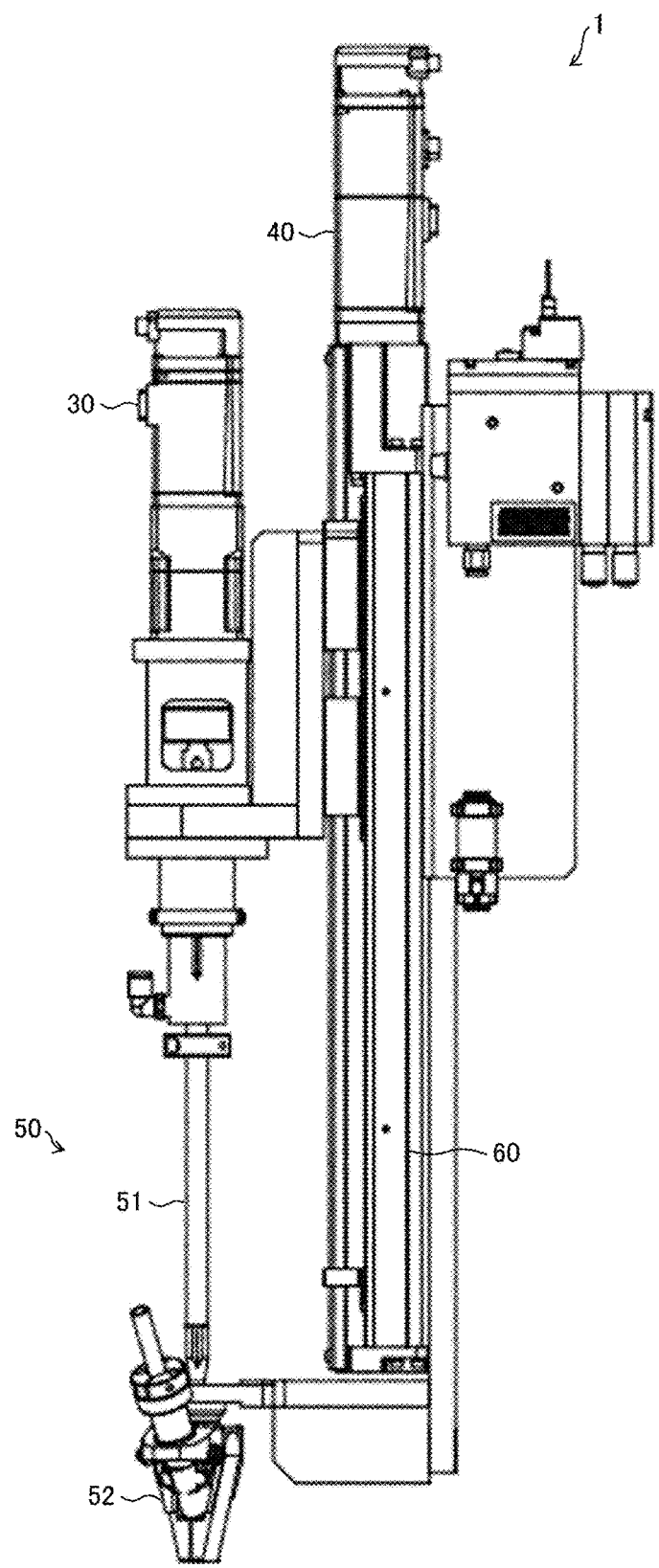
FIG. 3 is a diagram showing an example of an outer shape of the screw-tightening system according to the present embodiment.

FIG. 3 is a diagram showing an example of an outer shape of the screw-tightening system 1 according to the present embodiment. As shown in FIG. 3, the screw-tightening system 1 includes the rotation servo 30, the reciprocating servo 40, a driver unit 50, and a support column 60. Further, although not shown in FIG. 3, the screw-tightening system 1 also includes the PLC 10 and the coupler 20 as described above.

The driver unit 50 is a unit for performing screw tightening. The driver unit 50 includes a driver 51 and a screw holding part 52. The driver 51 performs a screw tightening operation by reciprocating in the axial direction while rotating around the axis. In the following description, among axial directions of the driver 51, a direction in which the driver 51 moves in the process of screw tightening is referred to as a downward direction.

The rotation servo 30 is disposed above the driver 51 and causes the rotational movement of the driver 51 around the axis. Further, the screw holding part 52 is provided below the driver 51 and holds a screw that is a target for screw tightening performed by the driver 51.

The support column 60 supports the driver unit 50 to be movable up and down. The reciprocating servo 40 is provided on an upper part of the support column 60 and is connected to the driver unit 50 via a ball screw (not shown). A rotational movement of the reciprocating servo 40 is converted into a linear movement in a vertical direction by the ball screw. As a result, the driver unit 50 reciprocates up and down.

Screw Tightening Operation

The screw tightening operation performed by the screw-tightening system 1 is as follows. First, the screw holding part 52 holding a screw lowers the screw to a place at which screw tightening is performed on a workpiece (fastening target) (not shown) that is a target for performing the screw tightening. The determination part 13 sets a time when a tip of the screw comes into contact with the workpiece as a time of descent completion thereof. Next, the driver 51 presses the screw against the place at which the screw tightening is performed while rotating the screw until the screw is provisionally seated. Here, the provisional seating indicates a state in which a seating surface of the screw is in contact with the workpiece. In the present embodiment, a state in which the rotation torque of the rotation servo 30 has reached 50% (a first predetermined value) is defined as a state in which the screw is provisionally seated. The determination part 13 sets the time when the rotation torque of the rotation servo 30 reaches the first predetermined value as a time when the screw is provisionally seated.

The screw-tightening system 1 performs primary tightening by pressing the screw against the workpiece while rotating the screw from the state in which the screw is provisionally seated. In the present embodiment, the primary tightening is performed until the rotation torque of the rotation servo 30 reaches 150% (a second predetermined value). Further, at this time, the screw-tightening system 1 sets the moving torque of the reciprocating servo 40 to a predetermined value (a third predetermined value). That is, the determination part 13 sets a period during which the rotation torque of the rotation servo 30 is equal to or greater than the first predetermined value and less than the second predetermined value, and the moving torque of the reciprocating servo 40 is the third predetermined value as a primary tightening period. When the rotation torque of the rotation servo 30 reaches 150%, the screw-tightening system 1 stops pressing the screw against the workpiece and holds the rotation torque at 150% or more for 100 ms.

Then, the rotation torque of the rotation servo 30 is caused to be 0% or less to release the screw. Further, by moving the driver 51 upward and returning it to an original position, the screw tightening operation is completed. However, the first to third predetermined values and the holding time described above are examples and differ depending on types of screws and types of fasteners and fastening targets.

Further, in the example of the screw tightening operation described above, the screw tightening is performed for the workpiece in a state in which a female screw is cut (tapped) in advance at the place at which the screw tightening is performed. However, the screw-tightening system 1 can also perform the screw tightening on the workpiece in a state in which a female screw is not cut at the place at which the screw tightening is performed (tapping (self-tap)).

In a case in which the screw tightening is performed on the workpiece for tapping, the rotation torque of the rotation servo 30 reaches 50% or more even when the screw is not provisionally seated. Therefore, in a case in which the screw tightening is performed on the workpiece for tapping, the determination part 13 determines a state in which the rotation torque of the rotation servo 30 reaches 100% as the state in which the screw is provisionally seated. However, the determination part 13 may set the rotation torque of the rotation servo 30 in which the screw is provisionally seated in the case in which the screw tightening is performed on the workpiece for tapping to another value.

§ 3 Operation Example

In the present embodiment, the determination part 13 determines the length of the screw on the basis of an axial position or an amount of rotation of the driver 51 during a period from the time of descent completion of the screw to a time of provisional seating, an end time of a primary tightening period, and an end time of a primary tightening holding period. Specifically, the determination performed by the determination part 13 in the present embodiment is either the following (1) or (2).

(1) The length of the screw is determined on the basis of a change in the position of the driver 51 in the axial direction during a period from the time of descent completion of the screw to the time of provisional seating or the end time of the primary tightening period.

(2) The length of the screw is determined on the basis of the amount of rotation of the driver 51 during the period from the time of descent completion of the screw to the end time of the primary tightening period or the end time of the primary tightening holding period.

The determination of the length of the screw performed by the determination part 13 will be described below.

3.1 Determination Based on Change in Position Until Provisional Seating

The determination part 13 may determine the length of the screw on the basis of, for example, an average value or the maximum value of the position of the driver 51 in the axial direction during the period from the time of descent completion of the screw to the time of provisional seating of the screw.

Figure 4:
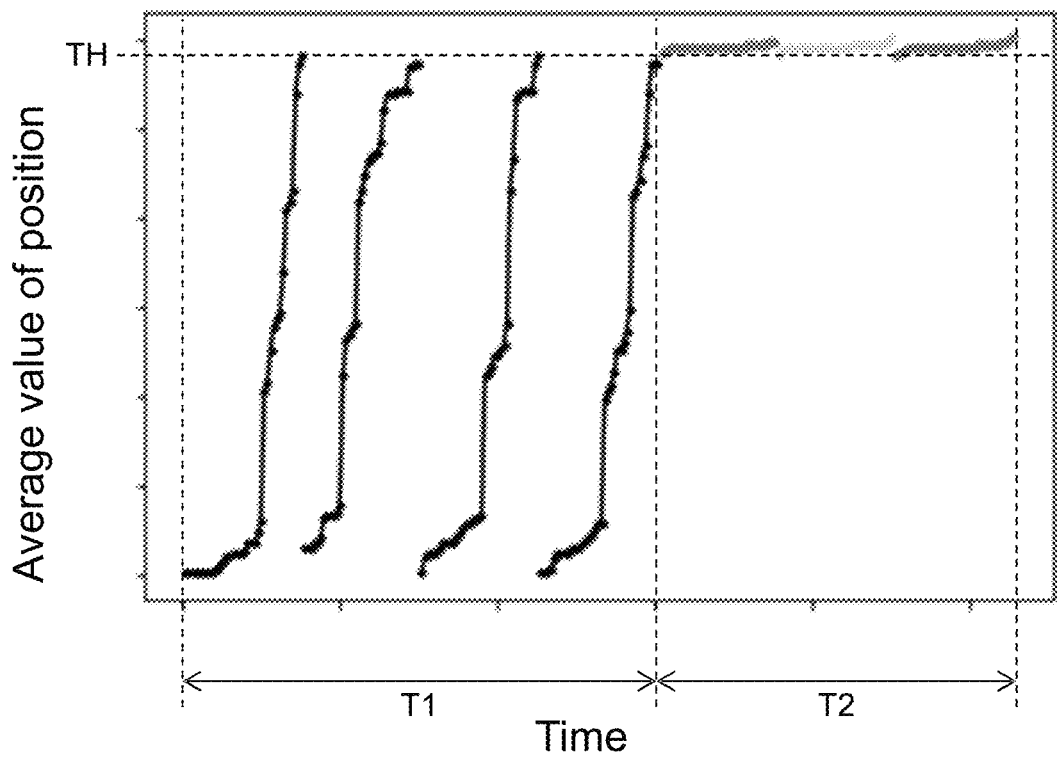
FIG. 4 is a graph showing a position of a driver in an axial direction thereof with respect to time during a period from a time of descent completion to a time of provisional seating of the screw, in which (a) shows an average value of the position, and (b) shows the maximum value of the position.
Figure 4:
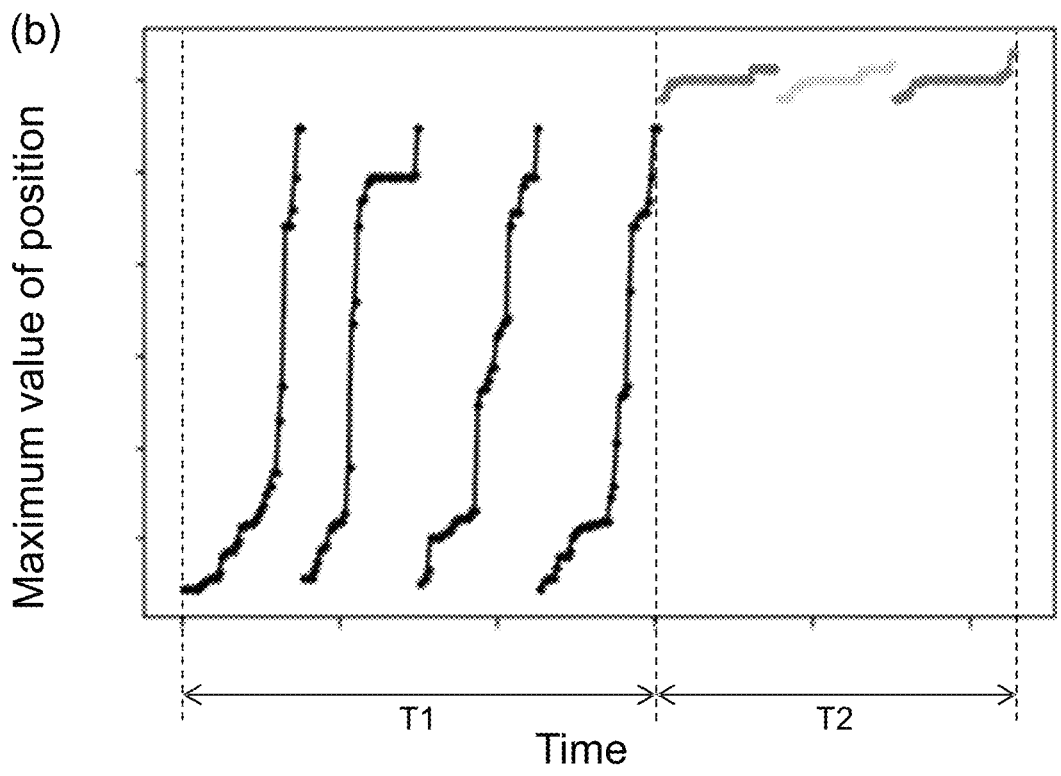

FIG. 4 is a graph showing the position of the driver 51 in the axial direction with respect to time during the period from the time of descent completion to the time of provisional seating of the screw, in which (a) shows the average value of the position, and (b) shows the maximum value of the position. In the graph shown in (a) of FIG. 4, the horizontal axis represents time, and the vertical axis represents the average value of the position of the driver 51 in the axial direction. Further, in the graph shown in (b) of FIG. 4, the horizontal axis represents time and the vertical axis represents the maximum value of the position of the driver 51 in the axial direction.

The graphs shown in (a) and (b) of FIG. 4 are divided into two regions T1 and T2 in the horizontal axis direction. In the region T1, four changes in the position of the driver 51 in screw tightening of an M4L8 screw are shown. In the region T2, three changes in the position of the driver 51 in screw tightening of an M4L10 screw are shown. Also, a second graph in the region T2 in (a) and (b) of FIG. 4 is shown with a different color from first and third graphs in the region T2 to distinguish it from those graphs.

As shown in (a) and (b) of FIG. 4, there is a clear difference between the M4L8 screw and the M4L10 screw, in the average value and the maximum value of the position of the driver 51 during the period from the time of descent completion to the time of provisional seating of the screw. In the example shown in (a) of FIG. 4, the average value of the position of the driver 51 changes in a range less than a threshold TH in the screw tightening process of the M4L8 screw, whereas it changes mainly in a range equal to and more than the threshold TH in the screw tightening process of the M4L10 screw. Therefore, for example, a threshold can be set for the average value or the maximum value of the position of the driver 51 during the above period. The determination part 13 can determine the length of the screw with high accuracy by determining the length of the screw on the basis of the threshold.

3.2 Determination Based on Change in Position Until End of Primary Tightening The determination part 13 may determine the length of the screw on the basis of the average value or the minimum value of the position of the driver 51 in the axial direction during the period from the time of descent completion of the screw to the end time of the primary tightening period of the screw.

Figure 5:
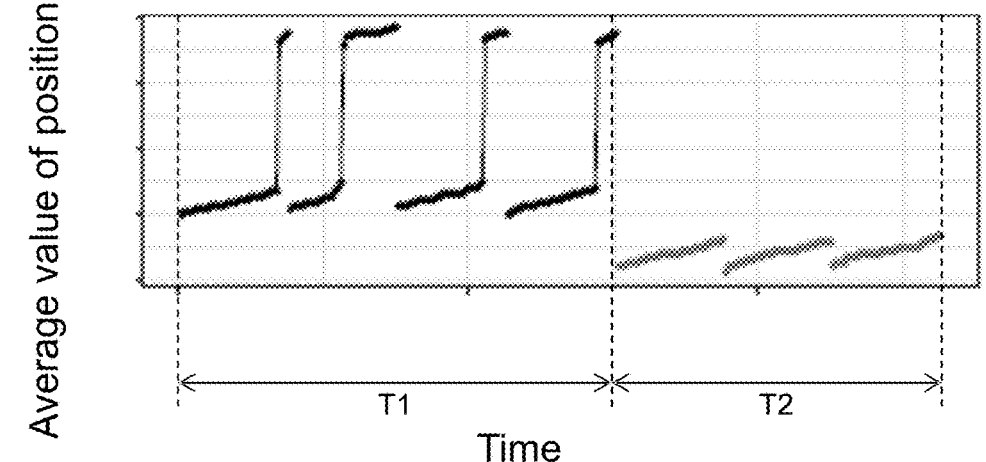
FIG. 5 is a graph showing a position of the driver in the axial direction with respect to time during a period from the time of descent completion of the screw to an end time of a primary tightening period of the screw, in which (a) shows an average value of the position, and (b) shows the minimum value of the position.
Figure 5:
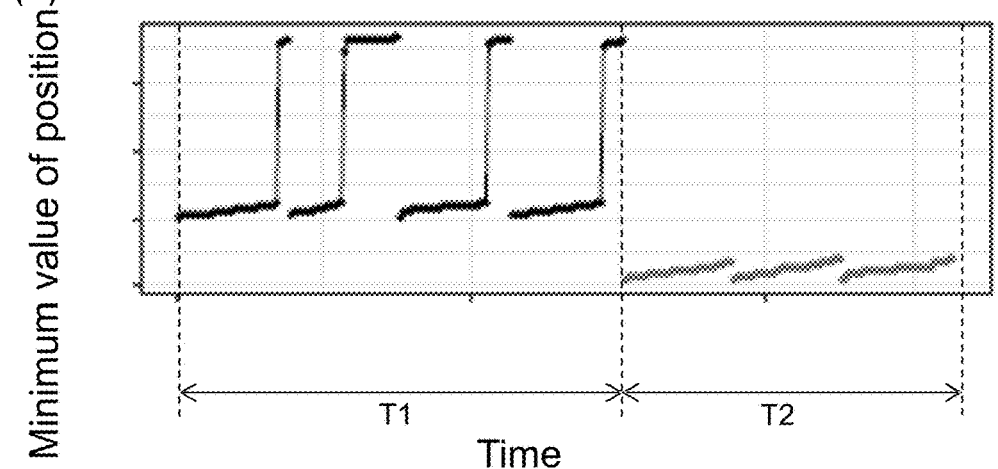

FIG. 5 is a graph showing the position of the driver 51 in the axial direction with respect to time during the period from the time of descent completion of the screw to the end time of the primary tightening period of the screw, in which (a) shows the average value of the position, and (b) shows the minimum value of the position. In the graph shown in (a) of FIG. 5, the horizontal axis represents time and the vertical axis represents the average value of the position of the driver 51 in the axial direction. Also, in the graph shown in (b) of FIG. 5, the horizontal axis represents time and the vertical axis represents the minimum value of the position of the driver 51 in the axial direction. In addition, the graphs shown in (a) and (b) of FIG. 5 are also divided into regions T1 and T2 similarly to the graphs shown in (a) and (b) of FIG. 4 in the horizontal axis direction.

As shown in (a) and (b) of FIG. 5, there is a clear difference between the M4L8 screw and the M4L10 screw, in an amount of change in the average value and the minimum value of the position of the driver 51 during the period from the time of descent completion of the screw to the end time of the primary tightening period of the screw. Therefore, for example, a threshold can be set for the amount of change in the average value or the minimum value of the position of the driver 51 during the above period. The determination part 13 can determine the length of the screw with high accuracy by determining the length of the screw on the basis of the threshold.

3.3 Determination Based on Change in Amount of Rotation Until End of Primary Tightening The determination part 13 may determine the length of the screw on the basis of, for example, the maximum value of the amount of rotation of the driver 51 during the period from the time of descent completion of the screw to the end time of the primary tightening period of the screw.

Figure 6:
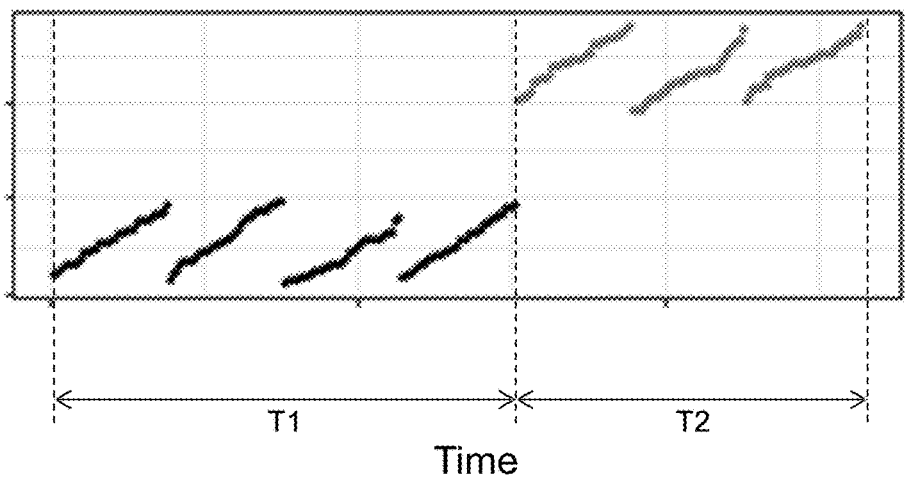
FIG. 6 is a graph showing the maximum value of an amount of rotation of the driver with respect to time during the period from the time of descent completion of the screw to the end time of the primary tightening period of the screw.

FIG. 6 is a graph showing the maximum value of the amount of rotation of the driver 51 with respect to time during the period from the time of descent completion of the screw to the end time of the primary tightening period of the screw. In the graph shown in FIG. 6, the horizontal axis represents time and the vertical axis represents the maximum value of the amount of rotation of the driver 51. In addition, the graph shown in FIG. 6 is also divided into regions T1 and T2 similarly to the graphs shown in (a) and (b) of FIG. 4 in the horizontal axis direction.

As shown in FIG. 6, there is a clear difference between the M4L8 screw and the M4L10 screw, in the maximum value of the amount of rotation of the driver 51 during the period from the time of descent completion of the screw to the end time of the primary tightening period of the screw. Therefore, for example, a threshold can be set for the maximum value of the amount of rotation of the driver 51 in the above period. The determination part 13 can determine the length of the screw with high accuracy by determining the length of the screw on the basis of the threshold.

3.4 Determination Based on Change in Amount of Rotation Until End of Holding Primary Tightening The determination part 13 may determine the length of the screw on the basis of, for example, the average value, the maximum value, or the minimum value of the amount of rotation of the driver 51 during the period from the time of descent completion of the screw to the end time of the primary tightening holding period.

Figure 7:
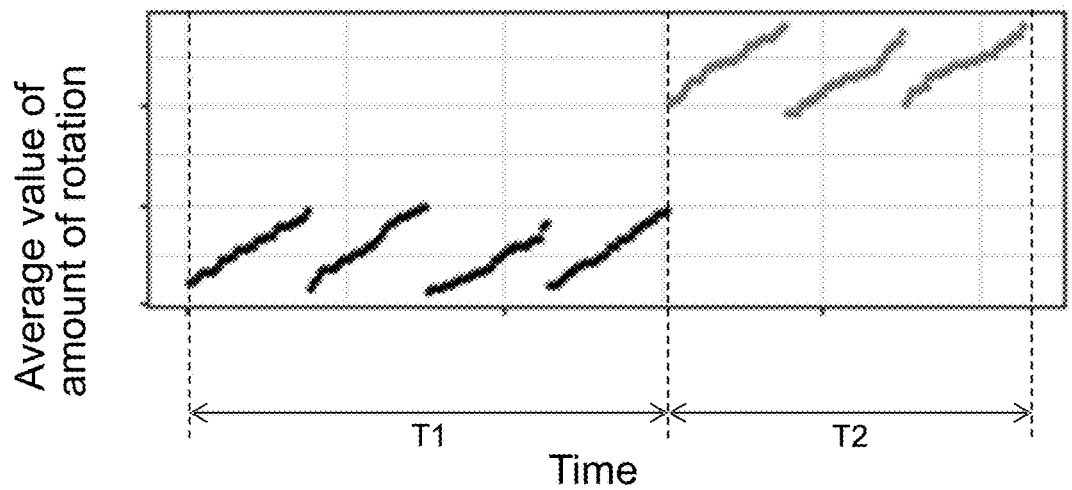
FIG. 7 is a graph showing an amount of rotation of the driver with respect to time during a period from the time of descent completion of the screw to an end time of a primary tightening holding period, in which (a) shows an average value of the amount of rotation, (b) shows the maximum value of the amount of rotation, and (c) shows the minimum value of the amount of rotation.
Figure 7:
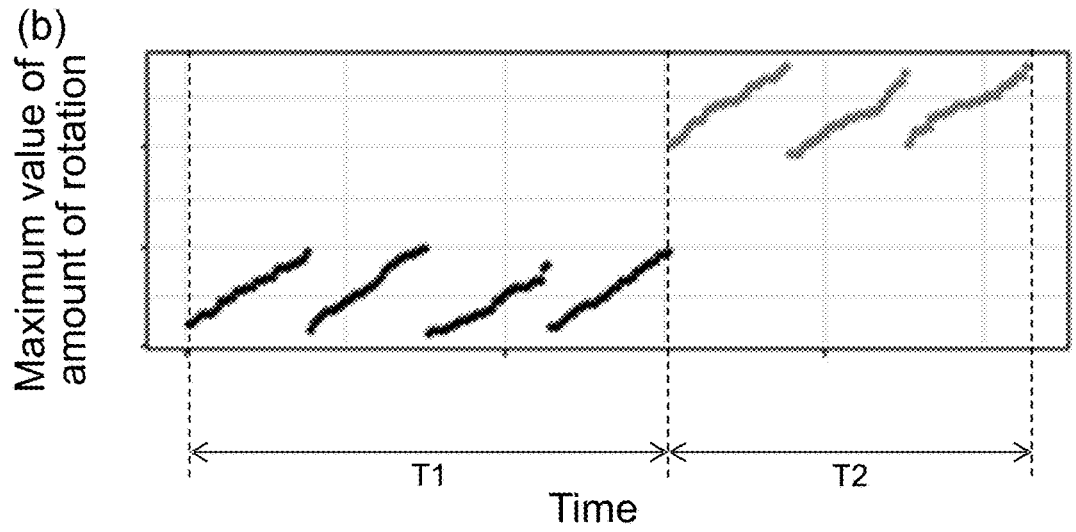
Figure 7:
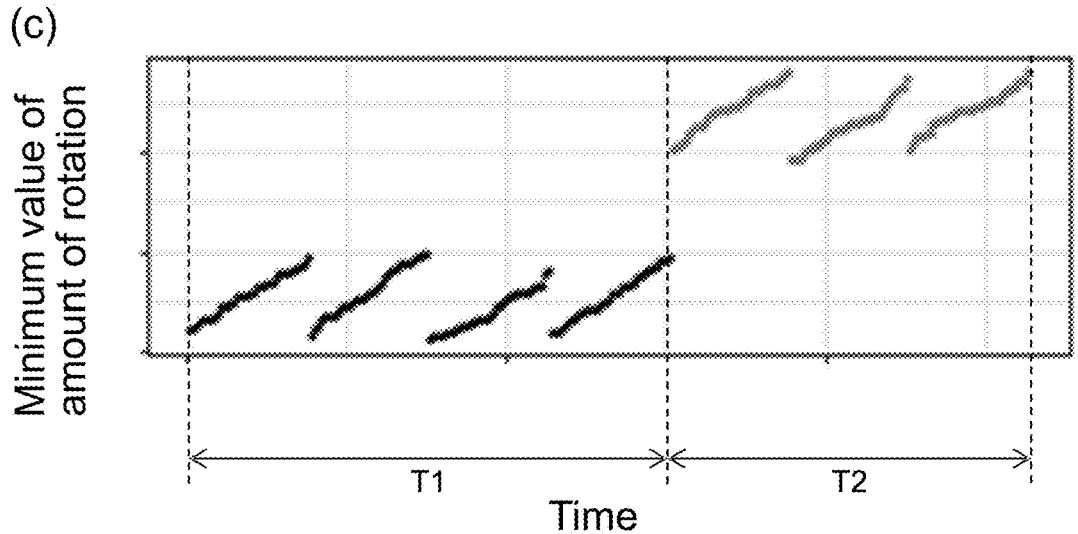

FIG. 7 is a graph showing the amount of rotation of the driver 51 with respect to time during the period from the time of descent completion of the screw to the end time of the primary tightening holding period of the screw, in which (a) shows the average value of the amount of rotation, (b) shows the maximum value of the amount of rotation, and (c) shows the minimum value of the amount of rotation. In the graph shown in (a) of FIG. 7, the horizontal axis represents time and the vertical axis represents the average value of the amount of rotation of the driver 51. Also, in the graph shown in (b) of FIG. 7, the horizontal axis represents time and the vertical axis represents the maximum value of the amount of rotation of the driver 51. Also, in the graph shown in (c) of FIG. 7, the horizontal axis represents time and the vertical axis represents the minimum value of the amount of rotation of the driver 51. In addition, the graphs shown in (a) to (c) of FIG. 7 are also divided into regions T1 and T2 similarly to the graphs shown in (a) and (b) of FIG. 4 in the horizontal axis direction.

As shown in (a) to (c) of FIG. 7, there is a clear difference between the M4L8 screw and the M4L10 screw, in between the average value, the maximum value, and the minimum value of the amount of rotation of the driver 51 during the period from the time of descent completion of the screw to the end time of the primary tightening holding period of the screw. Therefore, for example, a threshold can be set for the average value, the maximum value, or the minimum value of the amount of rotation of the driver 51 during the above period. The determination part 13 can determine the length of the screw with high accuracy by determining the length of the screw on the basis of the threshold.

3.5 Flow of Processing

Figures 8, 9:
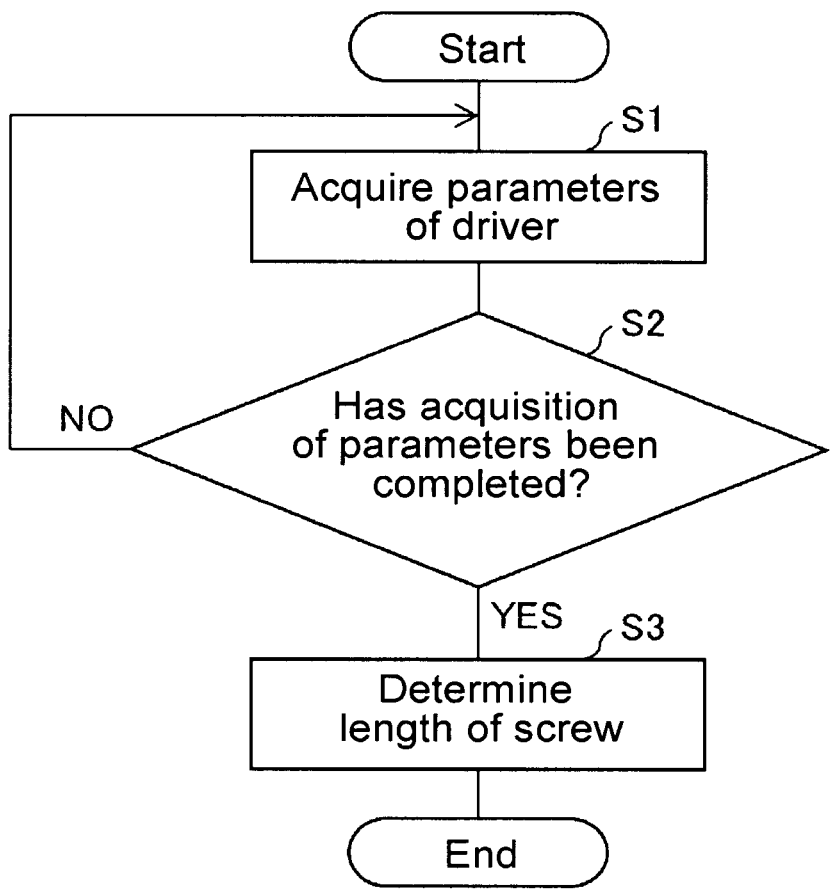
FIG. 8 is a flowchart showing an example of processing performed by a determination part.
FIG. 9 is a diagram showing an example of a table referred to by the determination part.

FIG. 8 is a flowchart showing an example of processing in the determination part 13. First, the determination part 13 acquires parameters used for determining the length of the screw from the rotation servo 30 or the reciprocating servo 40 (S1). For example, if the determination described in 3.1 is performed, the determination part 13 acquires information on the position of the driver 51 in the axial direction from the reciprocating servo 40 and calculates the average value thereof.

Next, the determination part 13 determines whether or not a period for acquiring the parameters has ended (S2). For example, if the determination described in 3.1 is performed, the determination part 13 determines whether or not the screw is provisionally seated. If the period for acquiring the parameters has not ended (NO in S2), the determination part 13 repeats the process from step S1.

On the other hand, when the period for acquiring the parameters has ended (YES in S2), the determination part 13 determines the length of the screw (S3). Then, the determination part 13 ends the process.

Through the above processing, by performing the determination of any of 3.1 to 3.4 described above, the PLC 10 can determine the length of the screw with high accuracy. In particular, in a case in which any of the determinations of 3.1 to 3.3 described above is performed, the PLC 10 can determine the length of the screw before the primary tightening holding period ends, and thus the length of the screw can be determined at an early stage.

Also, the PLC 10 may further include a notification part that notifies the length of the screw determined by the determination part 13 in step S3. For example, in a case in which the length of the screw determined by the determination part 13 is different from an appropriate length, the notification part may notify a user of the screw-tightening system 1 of that fact using voice, light, an image, or the like. In this case, the screw-tightening system 1 may include a speaker, a light emitting device, an image display device, or the like for the notification part to perform notification.

Further, in the example described above, the determination part 13 performs both acquisition of the parameters of the driver 51 and calculation of the length of the screw, but these may be executed by different processing parts.

Further, in the example described above, the PLC 10 performs both control of the screw tightening operation and determination of the length of the screw, but a PLC that performs the above control and a PLC that performs the above determination may be provided separately. For example, one controller for screw length determination may receive measurement data from a plurality of PLCs for controlling screw tightening and determine the length of the screw. In this case, the controller for screw length determination corresponds to the screw length determination system.

3.6 Determination with Reference to Table

FIG. 9 is a diagram showing an example of a table referred to by the determination part 13. In a case in which the determination of 3.1 or 3.2 described above, that is, the determination using the position of the driver 51 in the axial direction, is performed, the determination part 13 may determine the length of the screw by referring to a table showing a relationship between the length of the screw and the position of the driver 51 in the axial direction. FIG. 9 shows a table showing a relationship between the average value of the position of the driver 51 in the axial direction and the length of the screw in the case of determining the screw shown in the graph in (a) of FIG. 4. By determining the length of the screw with reference to such a table, the determination part 13 can reduce the influence of a variation in the position of the driver 51 in the screw tightening process due to individual differences between screws on the determination. The above table may be stored in a storage device (not shown) connected to the PLC 10 via, for example, the coupler 20.

§ 4 Modified Example

The control block (particularly the control part 11, the communication part 12, and the determination part 13) of the screw-tightening system 1 may be realized using a logic circuit (hardware) formed in an integrated circuit (IC chip) or the like, or may be realized using software.

In the latter case, the screw-tightening system 1 includes a computer for executing commands of a program that is software for realizing each function. This computer includes, for example, one or more processors and a computer-readable recording medium that stores the program. In addition, in the computer, the processor reads the program from the recording medium and executes it, thereby achieving the objective of the present invention. As the processor, for example, a central processing unit (CPU) can be used. As the recording medium, a "non-transitory tangible medium," for example, a tape, a disk, a card, a semiconductor memory, a programmable logic circuit or the like in addition to a read only memory (ROM) or the like can be used. Further, a random access memory (RAM) for loading the above program may be further provided. Also, the program may be supplied to the computer via an arbitrary transmission medium (a communication network, broadcasting waves, etc.) capable of transmitting the program. In addition, one aspect of the present invention can also be realized in the form of a data signal embedded in a carrier wave, in which the above program is embodied by electronic transmission.

The present invention is not limited to the embodiments described above, and various modifications can be made within the scope of the claims, and the embodiments obtained by appropriately combining the technical means disclosed in the different embodiments are also included in the technical scope of the present invention.

SUMMARY

As described above, the screw length determination system according to one aspect of the present invention determines the length of the screw on the basis of the position or the amount of rotation of the driver in the axial direction during the period from the time of descent completion to any of the time of provisional seating, the end time of the primary tightening period, and the end time of the primary tightening holding period in the case in which the time when the tip of the screw comes into contact with the fastening target that is the target for screw tightening is defined as the time of descent completion, the time when the seating surface of the screw comes into contact with the fastening target is defined as the time of provisional seating, the period during which the rotation torque of the first motor that causes the rotational movement of the driver for tightening the screw around the axis is equal to or greater than the first predetermined value and less than the second predetermined value, and the moving torque of the second motor that causes the driver to reciprocate in the axial direction is the third predetermined value is defined as the primary tightening period, and the period during which the rotation torque of the first motor that causes the rotational movement of the driver around the axis is the second predetermined value, and the moving torque of the second motor that causes the driver to reciprocate in the axial direction is the third predetermined value is defined as the primary tightening holding period.

According to the above configuration, the screw length determination system determines the length of the screw on the basis of the axial position or the amount of rotation of the driver during the period from the time of descent completion of the screw to an end of a predetermined screw tightening process. Therefore, the length of the screw can be determined with higher accuracy as compared with a case in which the length of the screw is determined on the basis of, for example, a time required for screw tightening.

Also, the screw length determination system according to one aspect of the present invention determines the length of the screw on the basis of the change in the axial position of the driver during the period from the time of descent completion to the time of provisional seating or the end time of the primary tightening period.

Also, the screw length determination system according to one aspect of the present invention determines the length of the screw on the basis of the average value or the maximum value of the axial position of the driver during the period from the time of descent completion to the time of provisional seating.

Also, the screw length determination system according to one aspect of the present invention determines the length of the screw on the basis of the average value or the minimum value of the axial position of the driver during the period from the time of descent completion to the end time of the primary tightening period.

Also, the screw length determination system according to one aspect of the present invention determines the length of the screw with reference to a table showing the relationship between the length of the screw and the axial position of the driver.

According to the above configuration, influence of a variation in a relative position between the screw and the workpiece due to a variation in the position of the driver, individual differences in length of screws, and individual differences in height of workpieces, or the like in the screw tightening process caused by individual differences between the screws on the determination can be reduced.

Also, the screw length determination system according to one aspect of the present invention determines the length of the screw on the basis of the amount of rotation of the driver during the period from the time of descent completion to the end time of the primary tightening period or the end time of the primary tightening holding period.

Also, the screw length determination system according to one aspect of the present invention determines the length of the screw on the basis of the maximum value of the amount of rotation of the driver during the period from the time of descent completion to the end time of the primary tightening period.

Also, the screw length determination system according to one aspect of the present invention determines the length of the screw on the basis of the average value, the maximum value, or the minimum value of the amount of rotation of the driver during the period from the time of descent completion to the end time of the primary tightening holding period.

Further, the screw-tightening system according to one aspect of the present invention includes the rotation servo that causes the rotational movement of the driver around the axis, the reciprocating servo that causes the driver to reciprocate in the axial direction, the axial position detection part that detects the axial position of the driver, and the screw length determination system according to any of the above aspects.

According to the above configuration, in the case in which the screw-tightening system causes the driver to move using the rotation servo and the reciprocating servo to tighten the screw, the screw length determination system can determine the length of the screw on the basis of the position of the driver detected by the axial position detection part or the amount of rotation of the driver acquired from the rotation servo.

Also, the program according to one aspect of the present invention operates a computer as the screw length determination system according to any one of the above aspects.

What is claimed is:

1. A screw length determination system which determines a length of a screw on the basis of an axial position or an amount of rotation of a driver during a period from a time of descent completion to any of a time of provisional seating, an end time of a primary tightening period, and an end time of a primary tightening holding period, in a case in which a time when a tip of the screw comes into contact with a fastening target that is a target for screw tightening is defined as the time of descent completion, a time when a rotation torque of a first motor that causes a rotational movement of the driver around an axis for tightening the screw reaches a first predetermined value is defined as the time of provisional seating, a period during which the rotation torque of the first motor is equal to or greater than the first predetermined value and less than a second predetermined value, and a moving torque of a second motor that causes the driver to reciprocate in an axial direction is a third predetermined value is defined as the primary tightening period, and a period during which the rotation torque of the first motor that causes the rotational movement of the driver around the axis is the second predetermined value, and the moving torque of the second motor that causes the driver to reciprocate in the axial direction is the third predetermined value is defined as the primary tightening holding period.

2. The screw length determination system according to claim 1, wherein the length of the screw is determined on the basis of a change in the axial position of the driver during the period from the time of descent completion to the time of provisional seating or the end time of the primary tightening period.

3. The screw length determination system according to claim 2, wherein the length of the screw is determined on the basis of an average value or a maximum value of the axial position of the driver during the period from the time of descent completion to the time of provisional seating.

4. The screw length determination system according to claim 2, wherein the length of the screw is determined on the basis of an average value or a minimum value of the axial position of the driver during the period from the time of descent completion to the end time of the primary tightening period.

5. The screw length determination system according to claim 3, wherein the length of the screw is determined with reference to a table showing a relationship between the length of the screw and the axial position of the driver.

6. The screw length determination system according to claim 1, wherein the length of the screw is determined on the basis of the amount of rotation of the driver during the period from the time of descent completion to the end time of the primary tightening period or the end time of the primary tightening holding period.

7. The screw length determination system according to claim 6, wherein the length of the screw is determined on the basis of a maximum value of the amount of rotation of the driver during the period from the time of descent completion to the end time of the primary tightening period.

8. The screw length determination system according to claim 6, wherein the length of the screw is determined on the basis of an average value, a maximum value, or a minimum value of the amount of rotation of the driver during the period from the time of descent completion to the end time of the primary tightening holding period.

9. The screw length determination system according to claim 1, comprising:
a rotation servo that causes a rotational movement of a driver around an axis;
a reciprocating servo that causes the driver to reciprocate in an axial direction;

an axial position detection part that detects an axial position of the driver.

10. A non-transitory computer readable storage medium, storing a program for operating a computer as the screw length determination system according to claim 1.

11. The screw length determination system according to claim 4, wherein the length of the screw is determined with reference to a table showing a relationship between the length of the screw and the axial position of the driver.

* * * * *